US012546160B2

(12) United States Patent
Huang et al.

(10) Patent No.: US 12,546,160 B2
(45) Date of Patent: Feb. 10, 2026

(54) DOOR PANEL MANUFACTURING METHOD

(71) Applicant: USUN TECHNOLOGY CO., LTD., Taoyuan (TW)

(72) Inventors: Chiu-Fong Huang, Taoyuan (TW); Hsiang-Yueh Yu, Taoyuan (TW)

(73) Assignee: USUN TECHNOLOGY CO., LTD., Taoyuan (TW)

( * ) Notice: Subject to any disclaimer, the term of this patent is extended or adjusted under 35 U.S.C. 154(b) by 175 days.

(21) Appl. No.: 18/509,707

(22) Filed: Nov. 15, 2023

(65) Prior Publication Data

US 2025/0154821 A1 May 15, 2025

(51) Int. Cl.
*E06B 3/26* (2006.01)
*E06B 3/263* (2006.01)

(52) U.S. Cl.
CPC .................................... *E06B 3/263* (2013.01)

(58) Field of Classification Search
CPC ................. E06B 3/26; E06B 2003/261; E06B 2003/2615; E06B 2003/2625; E06B 2003/262; E06B 3/263; E06B 3/26301; E06B 3/36303
See application file for complete search history.

(56) References Cited

U.S. PATENT DOCUMENTS

| | | | | |
|---|---|---|---|---|
| 9,441,412 | B1 * | 9/2016 | Hooper, Jr. | E06B 3/5821 |
| 10,280,678 | B1 * | 5/2019 | Rendon, Jr. | E06B 3/509 |
| 2001/0018814 | A1 * | 9/2001 | Degelsegger | E06B 3/26 52/205 |
| 2016/0376835 | A1 * | 12/2016 | Massey | E06B 9/52 49/398 |
| 2019/0242149 | A1 * | 8/2019 | Buonpane | E06B 9/02 |
| 2022/0090439 | A1 * | 3/2022 | Baca | E06B 3/9642 |
| 2022/0145693 | A1 * | 5/2022 | Allmandinger | E06B 5/003 |
| 2022/0168929 | A1 * | 6/2022 | Chiesa | B29C 44/58 |
| 2025/0154821 | A1 * | 5/2025 | Huang | E06B 3/263 |
| 2025/0179865 | A1 * | 6/2025 | Lee | E06B 3/549 |

* cited by examiner

*Primary Examiner* — Chi Q Nguyen
(74) *Attorney, Agent, or Firm* — MUNCY, GEISSLER, OLDS & LOWE, P.C.

(57) ABSTRACT

A door panel manufacturing method is provided. There is a filling space inside the frame of the door panel for the filling of a filling material to be, and the two panels of the door panel are respectively combined with the hollows on both sides of the frame to seal the filling space. Each panel has one side processed to provide a recessed portion so that a protruding portion corresponding to the recessed portion is formed on the other side and combined with a magnetically attracted material. In the manufacturing operation, jigs respectively provided with a magnet are assembled on the recessed portions to magnetically attract the panels for positioning, thereby preventing the residual glue formed when the jigs are detached from the surfaces of panels, and effectively maintaining the beauty and flatness of the surfaces of the panels.

5 Claims, 7 Drawing Sheets

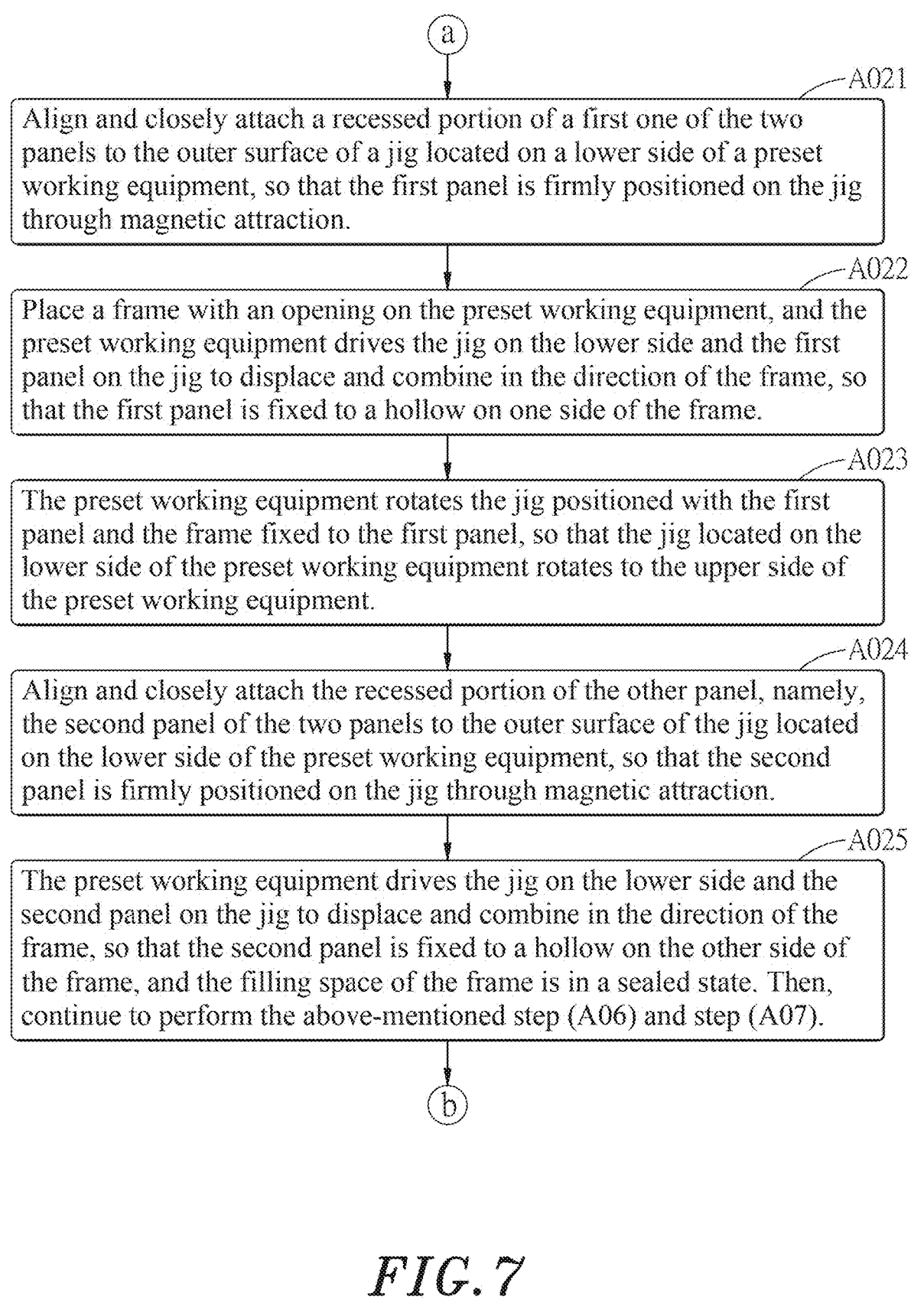

(a)

A021: Align and closely attach a recessed portion of a first one of the two panels to the outer surface of a jig located on a lower side of a preset working equipment, so that the first panel is firmly positioned on the jig through magnetic attraction.

A022: Place a frame with an opening on the preset working equipment, and the preset working equipment drives the jig on the lower side and the first panel on the jig to displace and combine in the direction of the frame, so that the first panel is fixed to a hollow on one side of the frame.

A023: The preset working equipment rotates the jig positioned with the first panel and the frame fixed to the first panel, so that the jig located on the lower side of the preset working equipment rotates to the upper side of the preset working equipment.

A024: Align and closely attach the recessed portion of the other panel, namely, the second panel of the two panels to the outer surface of the jig located on the lower side of the preset working equipment, so that the second panel is firmly positioned on the jig through magnetic attraction.

A025: The preset working equipment drives the jig on the lower side and the second panel on the jig to displace and combine in the direction of the frame, so that the second panel is fixed to a hollow on the other side of the frame, and the filling space of the frame is in a sealed state. Then, continue to perform the above-mentioned step (A06) and step (A07).

(b)

*FIG. 7*

DOOR PANEL MANUFACTURING METHOD

BACKGROUND OF THE INVENTION

1. Field of the Invention

The present invention relates to a door panel manufacturing method, in particular, panels are provided with recessed portions and protruding portions, and jigs are provided on the outside of the recessed portions and are assembled on the recessed portions, furthermore, the surface of the protruding portions is combined with magnetically attracted material, and magnets are provided inside the jigs, so that the panels can be firmly attracted to the jigs through magnetic attraction, thereby maintaining the beauty and smoothness of the panel surface, thereby saving time and labor in the door panel manufacturing process.

2. Description of the Related Art

In today's residential or commercial room doors, indoor partitions, and building partitions, most of the door panels are composed of a main body, two panels that are respectively combined on both sides of the main body, and a filling material that is filled inside the main body between the two panels. The filling material is used as sound insulation, heat insulation or warmth preservation materials. It evolves with the times and is used in various occasions in daily life. It has further derived many changes in color and style in shape and appearance. What remains unchanged is that the door panels still have recessed or protruding decorative designs to cater to the preferences of consumers.

During the filling operation of the door panel, the filling material will foam and expand inside the main body, so that the inside of the main body will be subjected to the outward extrusion of the filling material. Moreover, the concave or protruding decorative design on the door panel causes uneven pressure inside the panels. It is easy for the decorative design parts of the panels to expand and deform, leading to cracks or damage, which may lead to defective products during the manufacturing process of the door panel, thereby causing a waste of raw materials.

However, in the manufacturing process of basic door panels, the panels are fixed to the main body by means of jigs and other methods, and the jigs are used to support the surface of the panels so that the filling material can be filled inside the main body to prevent damage. When positioning between the general jigs and the panels, tape or adhesive tape is used to position the panels firmly on the jigs for subsequent processing. When the manufacturing process of the door panel is completed, the jigs will be separated from the panels, so that residual glue will adhere to the surface of the panels, and it will take more human resources and time to remove the residual glue, which will lead to a relative increase in costs, and at the same time affect the beauty and flatness of the panel surface. This has application deficiencies, is quite uncost-effective, and needs to be improved.

Therefore, how to solve the above problems and deficiencies is the key point that relevant manufacturers in this industry urgently want to study and improve.

SUMMARY OF THE INVENTION

In view of the above-mentioned problems and deficiencies, the inventor collected relevant information, and after various evaluations and considerations, he designed this door panel manufacturing method.

It is the main object of the present invention to carry out the manufacturing operation of the door panel in the following steps: (A01) recess each of two panels with at least one or more recessed portions on one side through pre-processing, and at least one or more protruding portions corresponding to the recessed portions are formed on the other side; (A02) combine the surfaces of each protruding portion of the two panels with a magnetically attracted material; (A03) extend each jig connected and installed on a preset working equipment into the interior of each recessed portion in the direction of each panel to form a close adhesion, so that a magnet embedded inside each jig performs magnetic attraction on the magnetically attracted material on the surface of each protruding portion, and each panel is firmly positioned on the respective jig through magnetic attraction; (A04) place a frame with an opening on the preset working equipment so that the two panels are respectively positioned at the hollows on both sides of the frame; (A05) the preset working equipment drives the jigs and the two panels on the jigs to displace and combine in the direction of the frame respectively, thereby forming the two panels fixed on the upper and lower sides of the frame, so that the two panels are fixed on the upper and lower sides of the frame to seal a filling space in the frame; (A06) extend an external preset pipe into the filling space along the opening of the frame, and fill a filling material into the filling space through the preset pipe; and (A07) after the filling space is filled with the filling material, the preset working equipment drives each jig to separate from each recessed portion, so that the two panels and the frame are formed into one body, thereby completing the manufacturing of the door panel.

In the implementation steps, the jigs can firmly magnetically attract the panels to the jigs through magnetic attraction to avoid the use of tape or other adhesive methods for positioning, thereby preventing the residual glue formed when the jigs are detached from the surfaces of panels, while reducing human resources and time for removing residual glue. It can effectively maintain the beauty and flatness of the surfaces of the panels, thereby saving time and labor in the door panel manufacturing process.

Another object of the present invention is to implement the following steps in sequence after step (A01) and step (A02): (A021) align and closely attach a recessed portion of a first one of the two panels to the outer surface of a jig located on a lower side of a preset working equipment, so that the first panel is firmly positioned on the jig through magnetic attraction; (A022) place a frame with an opening on the preset working equipment, and the preset working equipment drives the jig on the lower side and the first panel on the jig to displace and combine in the direction of the frame, so that the first panel is fixed to a hollow on one side of the frame; (A023) the preset working equipment rotates the jig positioned with the first panel and the frame fixed to the first panel, so that the jig located on the lower side of the preset working equipment rotates to the upper side of the preset working equipment; (A024) align and closely attach the recessed portion of the other panel, namely, the second panel of the two panels to the outer surface of the jig located on the lower side of the preset working equipment, so that the second panel is firmly positioned on the jig through magnetic attraction; (A025) the preset working equipment drives the jig on the lower side and the second panel on the jig to displace and combine in the direction of the frame, so that the second panel is fixed to a hollow on the other side of the frame, and the filling space of the frame is in a sealed state. Then, continue to perform the above-mentioned step (A06) and step (A07).

Still another object of the present invention is that during manufacturing operations of the door panel, the outer surface of the jig corresponds to the inner wall surface of the recessed portion, and when the two panels of the present invention are combined with the frame and filling material is filled in the filling space, the filling material will foam and expand in the filling space, causing the protruding portions to withstand the effect of outward extrusion. In this way, the outer surface of each jig is pressed against the inner wall surface of one respective recessed portion to prevent the protruding portions on the other side from being squeezed outward by the filling material and causing expansion, deformation or damage, thereby achieving the effect of improving the yield.

BRIEF DESCRIPTION OF THE DRAWINGS

FIG. 7 is another flow chart of the e present invention.

DETAILED DESCRIPTION OF THE PREFERRED EMBODIMENT

Figure 1:
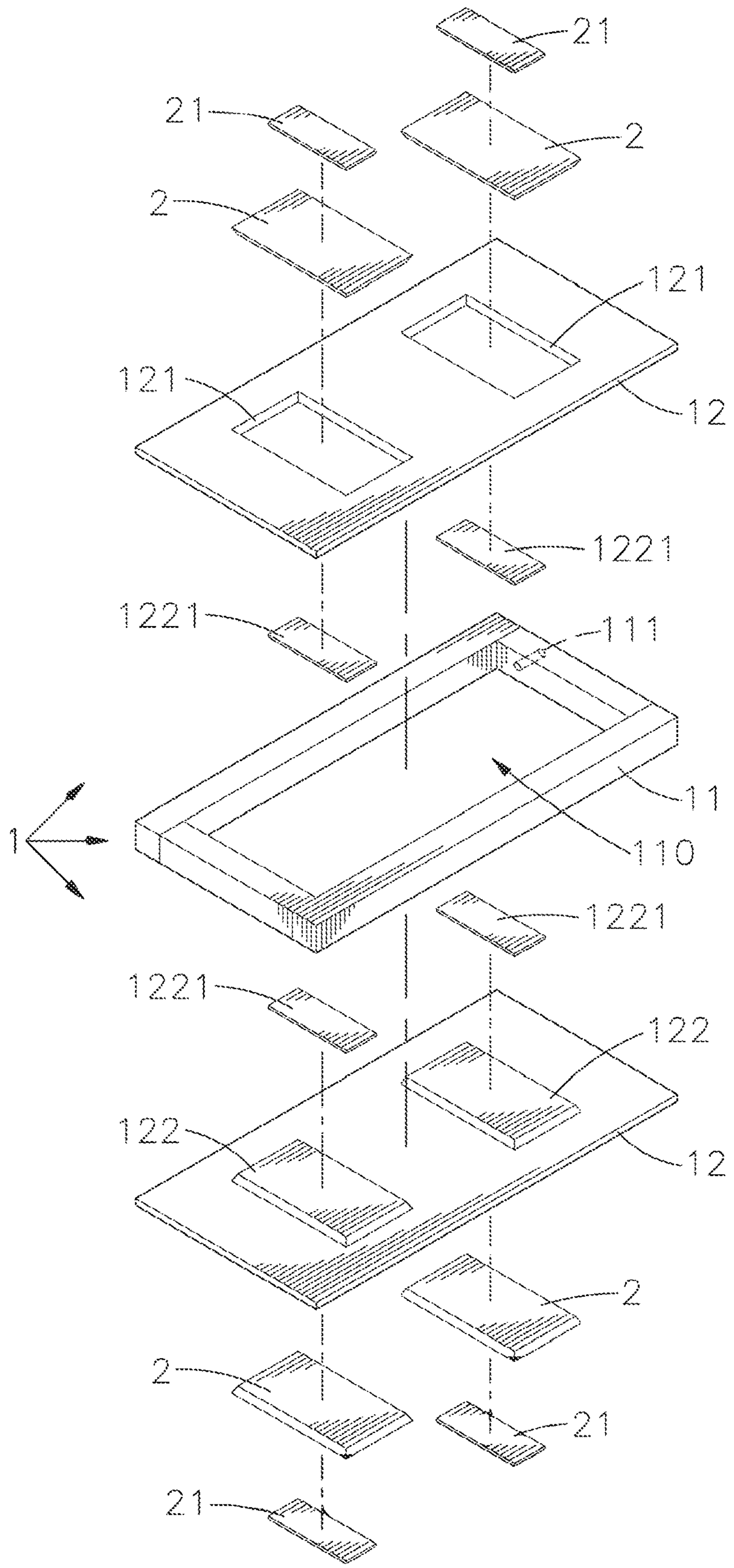
FIG. 1 is an exploded view of a door panel manufactured by the present invention.
Figure 2:
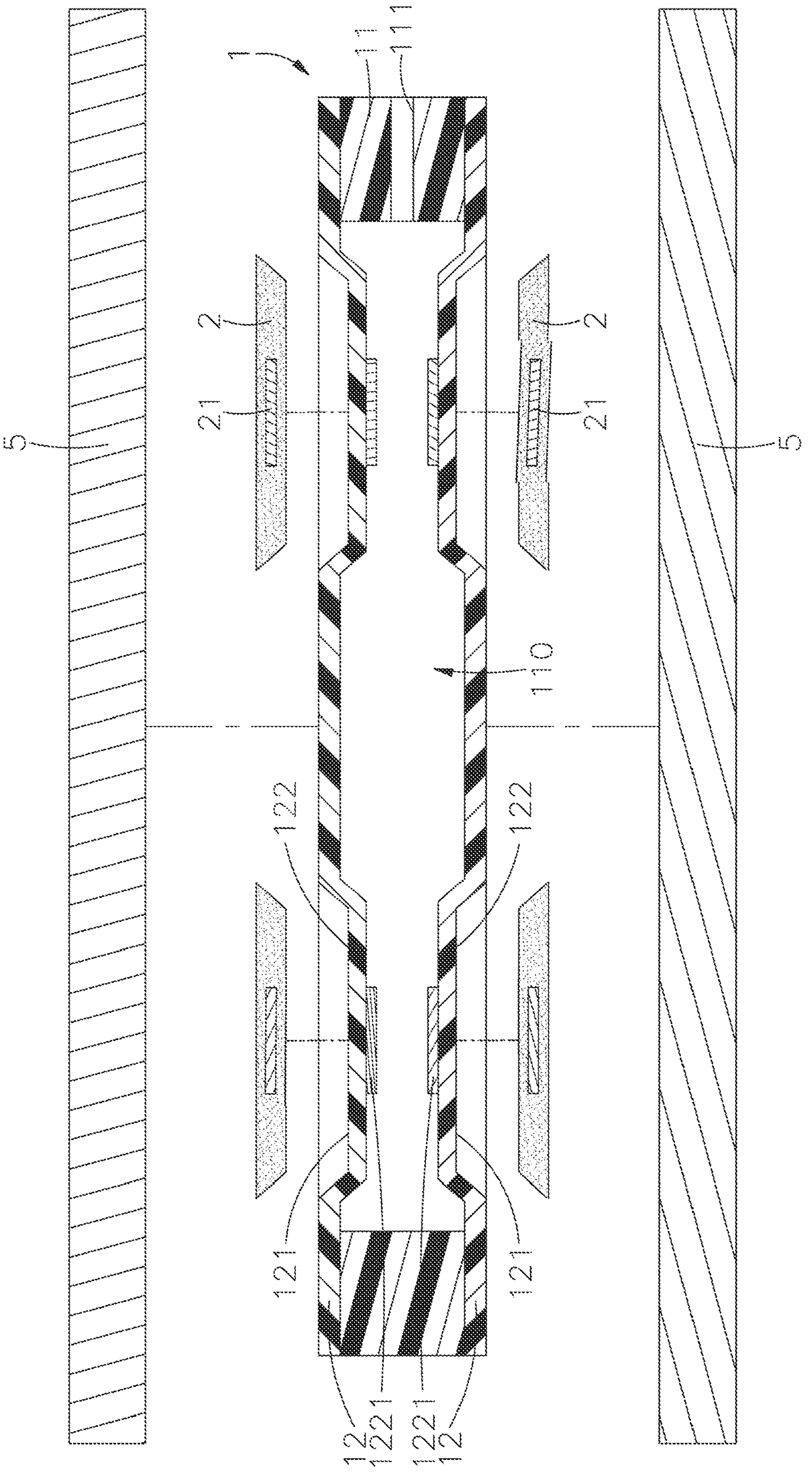
FIG. 2 is a schematic cross-sectional view (I) of the manufacturing process of the present invention.
Figure 3:
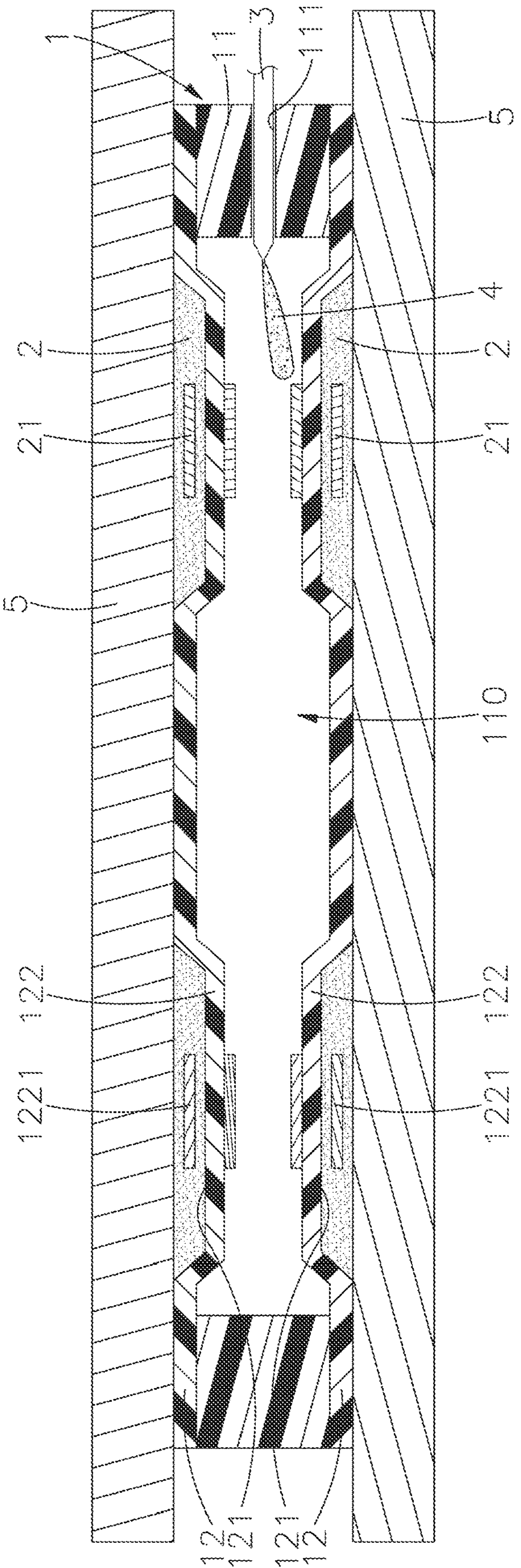
FIG. 3 is a schematic cross-sectional view (II) of the manufacturing process of the present invention.
Figure 4:
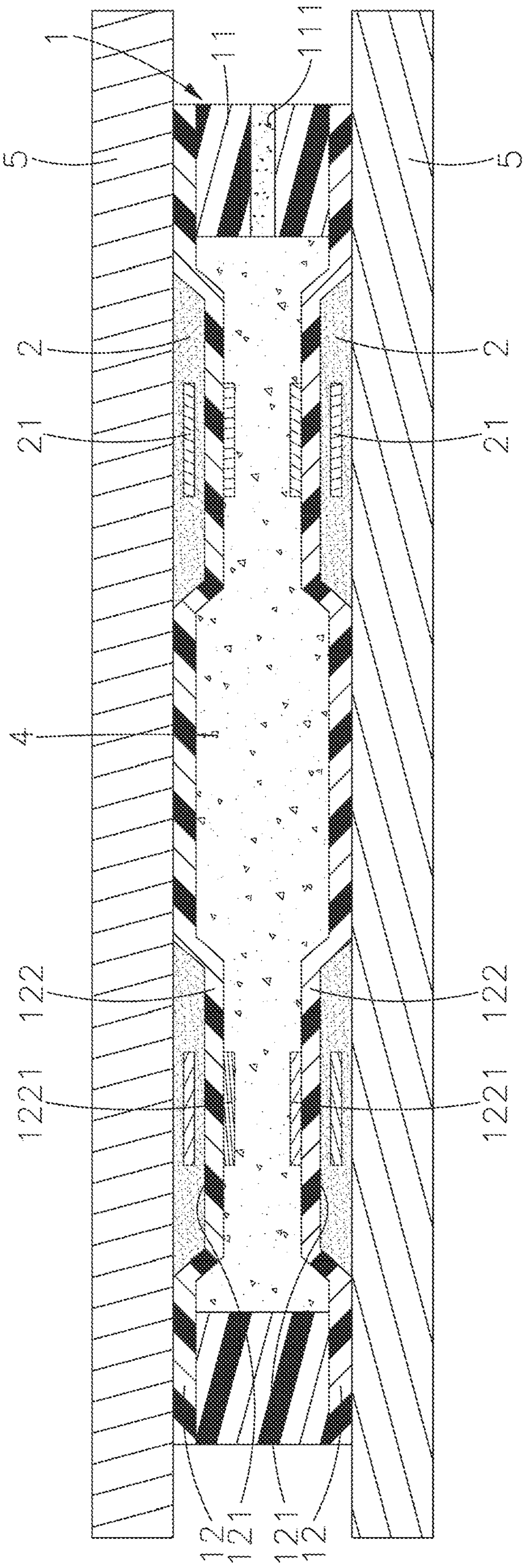
FIG. 4 is a schematic cross-sectional view (III) of the manufacturing process of the present invention.
Figure 5:
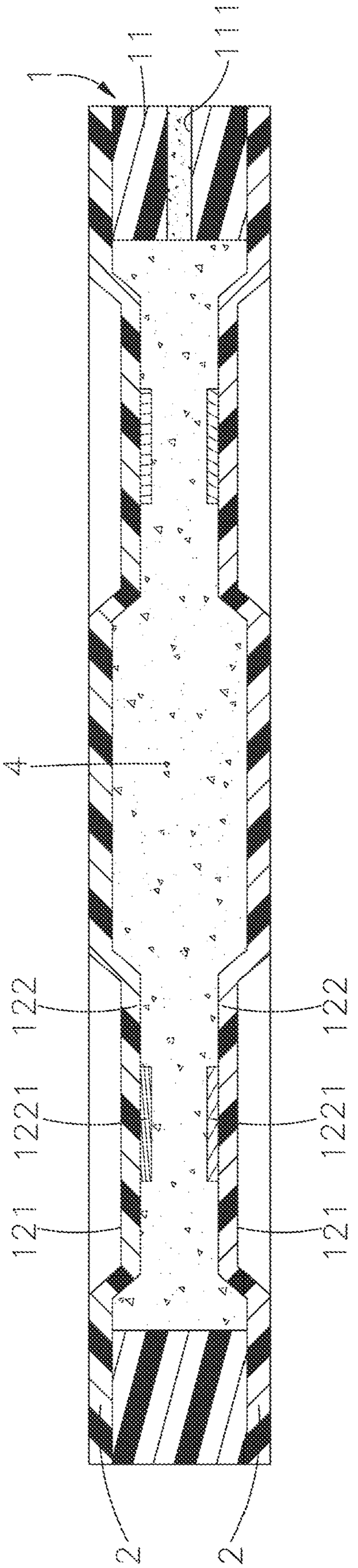
FIG. 5 is a schematic cross-sectional view (IV) of the manufacturing process of the present invention.

In order to achieve the above objects and effect, the technical means and structure adopted in this invention, the drawing is hereby described in detail with respect to the preferred embodiment of this invention. Its features and functions are as follows for fully understand.

Please refer to FIGS. 1 to 5, which are an exploded view of a door panel manufactured by the present invention and schematic cross-sectional views (I, II, III, IV) of the manufacturing process of the present invention. It can be clearly seen from the figures that the present invention comprises a door panel 1, and a plurality of jigs 2 for molding the door panel 1.

The door panel 1 comprises a frame 11 and two panels 12. The frame 11 has a filling space 110 hollowed out in the center, and one side of the filling space 110 is provided with an opening 111 penetrating outward on the frame 11. Thereby, the preset pipe 3 located outside can use the opening 111 to extend from the outside into the filling space 110 and be filled with the filling material 4 for foam filling operation. The two panels 12 are respectively combined with the hollows on both sides of the frame 11, and the plane dimensions of the two panels 12 are cut to correspond to the plane dimensions of the frame 11, so that the frame 11 completely covers the filling space 110 through the two panels 12 and is in a sealed state. The two panels 12 are respectively provided with at least one or more recessed portions 121 on the outer surfaces on the side away from the frame 11 and toward the frame 11, so that at least one or more protruding portions 122 corresponding to the recessed portions 121 are formed on the surfaces of the two panels 12 facing the frame 11 respectively. And the surface of each protruding portion 122 is combined with a magnetically attracted material 1221.

The plurality of jigs 2 are connected and installed on the external preset working equipment 5 so as to be oppositely arranged up and down, and the plurality of jigs 2 are aligned and assembled on the outside of each recessed portion 121 of the two panels 12. The set number of jigs 2 corresponds to the set number of the recessed portions 121 of the two panels 12. A magnet 21 is embedded inside each jig 2. The outer surface of each jig 2 corresponds to the inner wall surface of one respective recessed portion 121. When the two panels 12 of the present invention are combined with the frame 11 and filled with the filling material 4, the filling material 4 foams and expands due to filling in the filling space 110, causing the protruding portions 122 of the two panels 12 to undergo outward extrusion. The outer surface of the jig 2 is closely attached to the inner wall of the recessed portion 121, so that the outer surface of each jig 2 is pressed against the inner wall surface of the respective recessed portion 121 to prevent the associating protruding portion 122 on the other side from being squeezed and causing expansion, deformation, cracking or damage.

Figure 6:
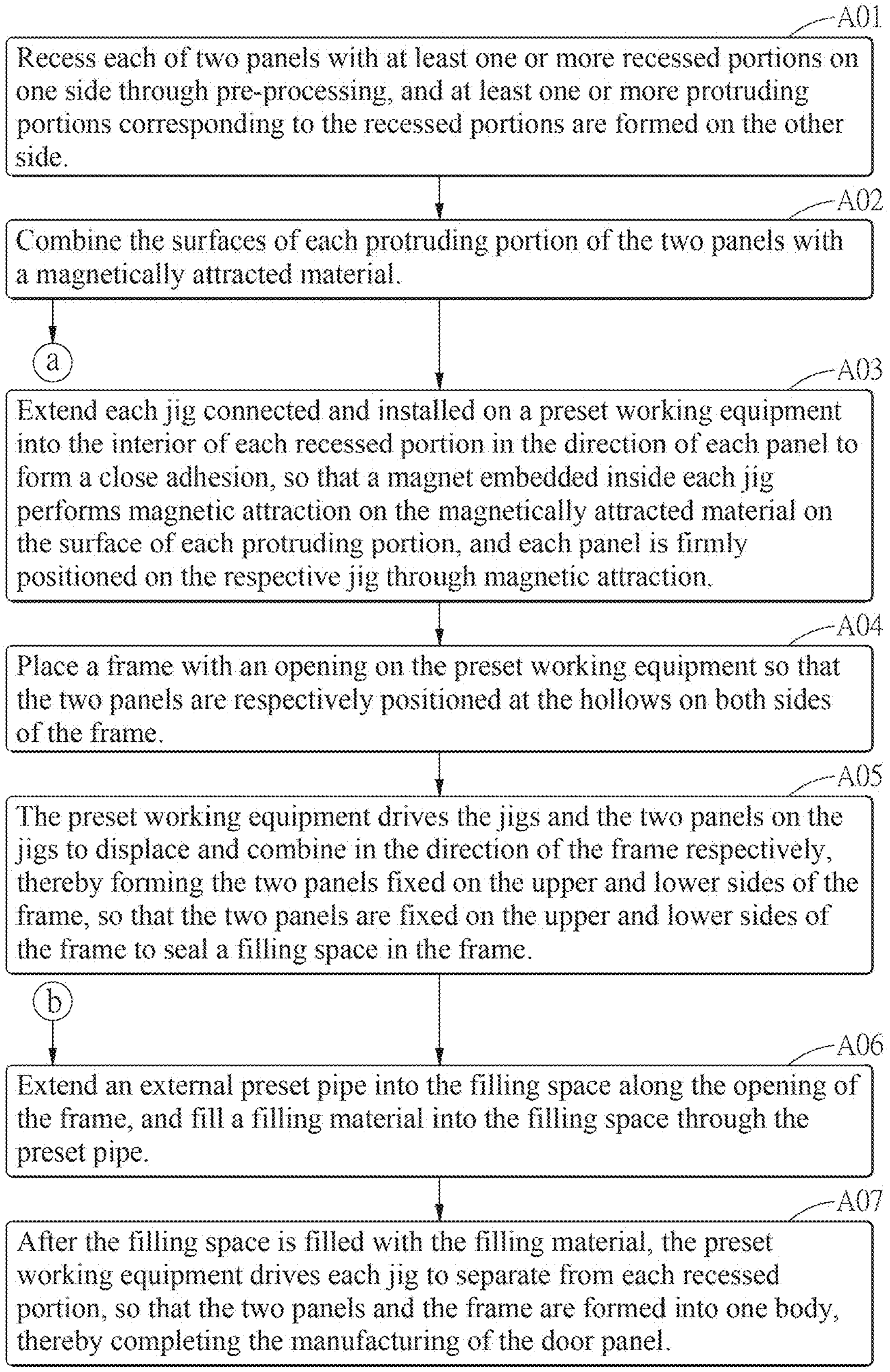
FIG. 6 is a flow chart of the e present invention.

Please continue to refer to FIG. 6, which is a flow chart of the present invention. It can be clearly seen from the figures that the door panel manufacturing method of the present invention comprises a door panel 1 and a plurality of jigs 2 for molding the door panel 1, and the manufacturing operation of the door panel 1 is carried out according to the following steps:

(A01) Two panels 12 are each recessed with at least one or more recessed portions 121 on one side through pre-processing, and at least one or more protruding portions 122 corresponding to the recessed portions 121 are formed on the other side.

(A02) Combine the surfaces of each protruding portion 122 of the two panels 12 with a magnetically attracted material 1221.

(A03) Extend each jig 2 connected and installed on a preset working equipment 5 into the interior of each recessed portion 121 in the direction of each panel 12 to form a close adhesion, so that a magnet 21 embedded inside each jig 2 performs magnetic attraction on the magnetically attracted material 1221 on the surface of each protruding portion 122, and each panel 12 is firmly positioned on the respective jigs 2 through magnetic attraction.

(A04) Place a frame 11 with an opening 111 on the preset working equipment 5 so that the two panels 12 are respectively positioned at the hollows on both sides of the frame 11.

(A05) The preset working equipment 5 drives the jigs 2 and the two panels 12 on the jigs 2 to displace and combine in the direction of the frame 11 respectively, thereby forming the two panels 12 fixed on the upper and lower sides of the frame 11, so that the two panels 12 are fixed on the upper and lower sides of the frame 11 to seal a filling space 110 in the frame 11.

(A06) Extend an external preset pipe 3 into the filling space 110 along the opening 111 of the frame 11, and fill a filling material 4 into the filling space 110 through the preset pipe 3.

(A07) After the filling space 110 is filled with the filling material 4, the preset working equipment 5 drives each jig 2 to separate from each recessed portion 121, so that the two panels 12 and the frame 11 are formed into one body, thereby completing the manufacturing of the door panel 1.

In the above step (A02), the magnetically attracted material 1221 is in the form of an iron sheet and is attached to the surface of each protruding portion 122, so that a magnetic attraction effect occurs between the magnetically attracted material 1221 and the magnet 21 of the jig 2. Therefore, the magnetically attracted material 1221 does not have to be designed in the form of an iron sheet. Iron powder or other magnetically attractive powder can also be coated on the surface of each protruding portion 122 in the form of paint for the magnet 21 to generate magnetic attraction. Therefore, the surface of the protruding portion 122 only needs to be provided with magnetic attraction properties. Such simple equal changes and modifications do not limit the scope of protection of the present invention, and are hereby stated.

In the above step (A03), the jigs 2 and the preset working equipment 5 can be designed separately, so that during the manufacturing process of the door panel 1, various graphics or patterns are provided on the surface of the panels 12. In order to match various graphics or patterns, the jigs 2 can be disassembled from the preset working equipment 5 for replacement settings, so that during the manufacturing process of the door panel 1, there is no need to significantly adjust the preset working equipment 5, thus reducing the equipment requirements, assembly time and testing. There is a magnet 21 embedded inside each jig 2, so that the jigs 2 can act as a magnetic attraction through the magnets 21 and the magnetically attracted material 1221, thereby adsorbing the panels 12 to the jigs 2. Therefore, the magnet 21 of each jig 2 does not have to be designed to be embedded. It can also be used by providing a recessed space inside each jig 2 so that the magnet 21 or an electromagnet is installed in the recessed space. Moreover, the jigs 2 can be made of plastic, etc., and can be used to quickly correspond to various graphics or patterns of the panels 12 by using injection molding or heat and pressure molding. When the main body of each jig 2 itself is made of magnets, etc., complicated manufacturing is required to adapt to the various graphics or patterns of panels 12, which will increase the production cost of the process accordingly and is not cost-effective. However, such simple equal changes and modifications should still be included in the patent scope covered by the present invention.

In the above step (A06), the two panels 12 can be non-magnetic metal materials such as wooden boards, fiberglass boards, plastic boards or melamine boards. The frame 11 can be made of wood, plastic, etc., and the frame 11 can be integrally formed or made by splicing angle material. However, the two panels 12 and the frame 11 can be bonded together by bonding, etc. The bonding method is not the main technical content of the present invention, so the technical content of the component range will not be described in detail.

In the above step (A06), the filling material 4 can be a material such as PE (polyethylene polymer), which provides functions such as strengthening the sound insulation, heat insulation or flame retardancy of the door panel 1.

In the above-mentioned steps (A03) to (A06), the sequence of the implementation steps of combining the panels 12 with the jigs 2 and the implementation steps of placing the frame 11 on the preset working equipment 5 can be changed according to the process design or equipment settings. In the preferred embodiment of the present invention, the manufacturing method of the door panel 1 is to set the panels 12 and the frame 11 in a horizontal processing type, so that the jigs 2 are longitudinally displaced to support the recessed portions 121. It can also be changed according to the equipment settings to set the panels 12 and the frame 11 in a vertical processing type, so that the jigs 2 can be moved laterally to support the recessed portions 121. Such simple equal changes and modifications should still be included in the patent scope covered by the present invention.

Please continue to refer to FIG. 7, which is another flow chart of the present invention. As shown in the figure, it can be clearly seen that the main difference between another implementation steps of the present invention and the aforementioned preferred implementation steps is that the preset working equipment 5 can rotate the plurality of jigs 2, and the frame 11 can be movably assembled. After implementing step (A01) and step (A02), then implement the following steps in sequence:

(A021) Align and closely attach a recessed portion 121 of a first one of the two panels 12 to the outer surface of a jig 2 located on a lower side of a preset working equipment 5, so that the first panel 12 is firmly positioned on the jig 2 through magnetic attraction.

(A022) Place a frame 11 with an opening 111 on the preset working equipment 5, and the preset working equipment 5 drives the jig 2 on the lower side and the first panel 12 on the jig 2 to displace and combine in the direction of the frame 11, so that the first panel 12 is fixed to a hollow on one side of the frame 11.

(A023) The preset working equipment 5 rotates the jig 2 positioned with the first panel 12 and the frame 11 fixed to the first panel 12, so that the jig 2 located on the lower side of the preset working equipment 5 rotates to the upper side of the preset working equipment 5.

(A024) Align and closely attach the recessed portion 121 of the other panel 12, namely, the second panel 12 of the two panels 12 to the outer surface of the jig 2 located on the lower side of the preset working equipment 5, so that the second panel 12 is firmly positioned on the jig 2 through magnetic attraction.

(A025) The preset working equipment 5 drives the jig 2 on the lower side and the second panel 12 on the jig 2 to displace and combine in the direction of the frame 11, so that the second panel 12 is fixed to a hollow on the other side of the frame 11, and the filling space 110 of the frame 11 is in a sealed state. Then, continue to perform step (A06) and step (A07).

Therefore, the present invention has the following advantages:

1. The surface of each protruding portion 122 of each panel 12 is combined with a magnetically attracted material 1221, and a magnet 21 is provided inside each jig 2, so that the panels 12 can be firmly positioned on the jigs 2 through magnetic attraction for subsequent processing. This avoids the use of tape or adhesive methods for positioning, thereby preventing the residual glue formed when the jigs 2 are detached from the surfaces of panels 12, while reducing human resources and time for removing residual glue. It can effectively maintain the beauty and flatness of the surfaces of the panels 12, thereby saving time and labor in the door panel manufacturing process.

2. When the filling material 4 is filled in the filling space 110, the filling material 4 will foam and expand, causing the panels 12 combined on both sides of the frame 11 to bear the outward extrusion of the filling material 4. The thickness of the two panels 12 is relatively narrow, and the two panels 12 are designed in the form of recessed portions 121 and protruding portions 122, so that the protruding portions 122 can bear a larger pressure area during the filling process. In this way, the outer surface of each jig 2 is pressed against the inner wall surface of one respective recessed portion 121 to prevent the protruding portions 122 on the other side from being squeezed outward by the filling material 4 and causing expansion, deformation or damage, thereby achieving the effect of improving the yield.

3. The door panel manufacturing method of the present invention can retain the original manufacturing process and the materials of the panels 12 and the frame 11, which serves as the basis for setting up the manufacturing method of the present invention. It can also be quickly applied to the original manufacturing process, thereby achieving the effect of reducing the cost of changing or modifying the manufacturing processes and materials.

However, the above detailed description is only a description of a preferred feasible embodiment of the present invention. However, this embodiment is not intended to limit the patentable scope of the present invention. All other equivalent changes and modifications made without departing from the technical spirit disclosed in the present invention shall be included in the patent scope covered by the present invention.

In summary, the door panel manufacturing method of the present invention has significant improvement in efficiency when used, and it sincerely meets the application requirements for an invention patent. I have filed an application in accordance with the law and hope that the review committee will approve this case as soon as possible to protect the inventor's hard work. If the review committee has any doubts, please feel free to send a letter for instructions. The inventor will do his best to cooperate. I really appreciate it.

What the invention claimed is:

1. A door panel manufacturing method, comprising steps of:

(A01) recessing each of two panels with at least one recessed portion on one side of each said panel through pre-processing, so that at least one protruding portion corresponding to at least one said recessed portions in formed on an opposite side of each said panel;

(A02) combining a surface of each said protruding portion of said two panels with a magnetically attracted material;

(A03) extending each of a plurality of jigs connected and installed on a preset working equipment into an interior of each said recessed portion in a direction of each said panel to form a close adhesion, so that a magnet embedded inside each said jig performs magnetic attraction on said magnetically attracted material on the surface of each said protruding portion, and each said panel is firmly positioned on respective said jigs through magnetic attraction;

(A04) placing a frame with an opening on said preset working equipment so that said two panels are respectively positioned at a respective hollows on both sides of said frame;

(A05) said preset working equipment driving said jigs and said two panels on said jigs to displace and combine in a direction of said frame respectively, thereby forming said two panels fixed on upper and lower sides of said frame, so that said two panels are fixed on the upper and lower sides of said frame to seal a filling space in said frame;

(A06) extending an external preset pipe into said filling space along said opening of said frame, and filling a filling material into said filling space through said preset pipe; and (A07) after said filling space is filled with said filling material, said preset working equipment driving each said jig to separate from each said recessed portion, so that said two panels and said frame are formed into one body, thereby completing the manufacturing of said door panel.

2. The door panel manufacturing method as claimed in claim 1, wherein after implementing said step (A01) and said step (A02), then implement following steps in sequence:

(A021) aligning and closely attaching one said recessed portion of a first one of said two panels to an outer surface of one respective jig located on a lower side of a preset working equipment, so that said first panel is firmly positioned on said jig through magnetic attraction;

(A022) placing a frame with an opening on said preset working equipment, and said preset working equipment driving said jig on the lower side and said first panel on said jig to displace and combine in a direction of said frame, so that said first panel is fixed to a hollow on one side of said frame;

(A023) said preset working equipment rotating said jig positioned with said first panel and said frame fixed to said first panel, so that said jig located on the lower side of said preset working equipment rotates to an upper side of said preset working equipment;

(A024) aligning and closely attaching said recessed portion of a second said panel of said two panels to the outer surface of said jig located on the lower side of said preset working equipment, so that said second panel is firmly positioned on said jig through magnetic attraction;

(A025) said preset working equipment driving said jig on the lower side and said second panel on said jig to displace and combine in a direction of said frame, so that said second panel is fixed to a hollow on an opposite side of said frame, and a filling space of said frame is in a sealed state;

then, continue to perform said step (A06) and said step (A07).

3. The door panel manufacturing method as claimed in claim 1, wherein in step (A02), said magnetically attracted material is selectively a material with magnetically attracted properties of iron sheets or iron powder.

4. The door panel manufacturing method as claimed in claim 1, wherein in step (A03), each said jig has an outer surface corresponding to an inner wall surface of one respective said recessed portion, so that the outer surface of each said jig is closely attached to the inner wall surface of the respective said recessed portion, and when said filling material is filled in said filling space, the outer surface of each said jig is supported against the respective said recessed portion and jointly supported on the surface of an associating said protruding portion.

5. The door panel manufacturing method as claimed in claim 1, wherein in step (A03), the plurality of said jigs are made of plastic.

* * * * *